April 22, 1947.  E. C. MISSBACH  2,419,324
TREATMENT OF INSOLUBLE SULPHUR
Filed May 14, 1945
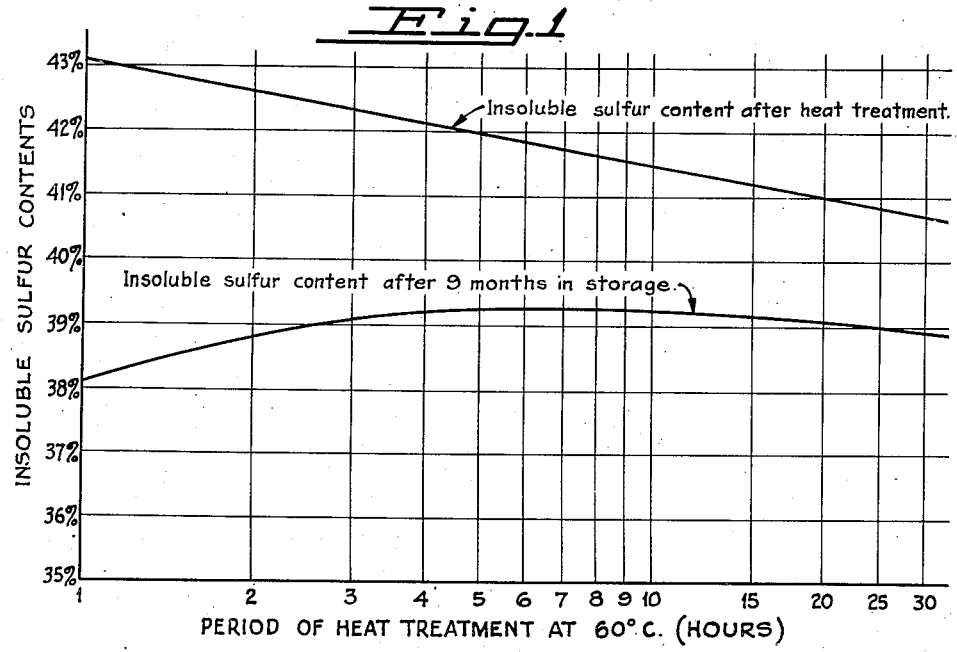
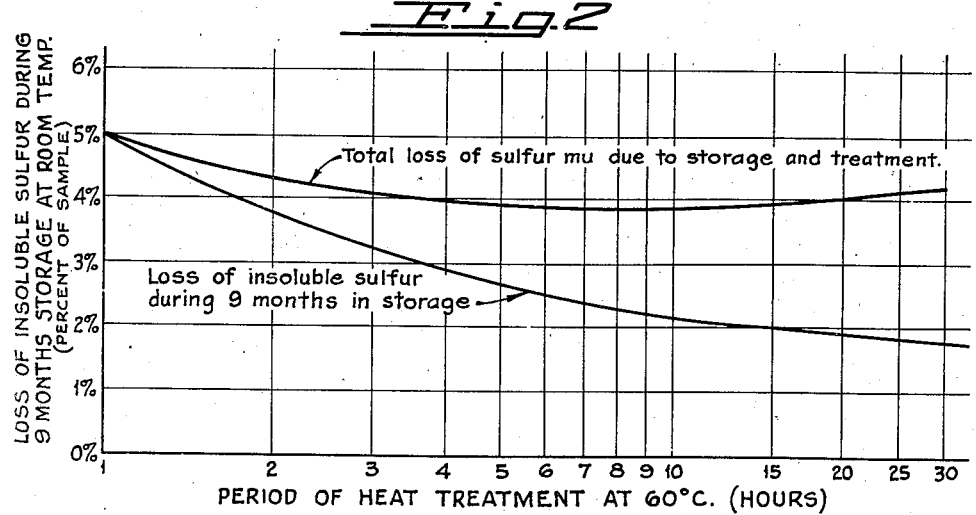
INVENTOR.
Edmund C. Missbach
BY
ATTORNEY Patented Apr. 22, 1947

2,419,324

UNITED STATES PATENT OFFICE 2,419,324

TREATMENT OF INSOLUBLE SULPHUR

Edmund C. Missbach, Oakland, Calif., assignor to Stauffer Chemical Company, a corporation of California Application May 14, 1945, Serial No. 593,610

14 Claims. (Cl. 23—224)

This application is a continuation of part of application Serial Number 505,817 filed October 11, 1943.

This invention relates to the stabilizing of the carbon bisulphide insoluble fraction of a sulphur against reversion to that form of sulphur which is soluble in the carbon bisulphide. Insoluble sulphur is sometimes designated as "sulphur mu" and for convenience, this term will be employed in describing the present invention.

Sulphur containing a sulphur mu fraction can be produced by various means. For example, sulphur containing a sulphur mu fraction is produced upon quenching liquid sulphur or sulphur vapor in various media such as water, aqueous solutions of various acids and in organic materials which are not reactive with sulphur such as benzene, toluene, xylene and carbon bisulphide. According to the work of Ross and Wilde (application Serial Number 577,438 filed February 12, 1945) a sulphur containing over 80% insoluble sulphur can be secured by reacting sulphur dioxide and hydrogen sulphide in stoichiometric proportions and in an aqueous bath containing certain specified quantities of sulphuric acid or hydrochloric acid. Flowers of sulphur also contain mu sulphur. By treating flowers of sulphur with carbon bisulphide the soluble sulphur content can be extracted to leave a residue high in sulphur mu content, between 60% and 100%. In application Serial Number 518,081, filed January 13, 1944, Belchetz has disclosed quenching sulphur vapor in carbon bisulphide to produce insoluble sulphur.

I have observed that irrespective of the source of the sulphur containing S mu, the S mu content steadily decreases with the passage of time, the insoluble sulphur reverting to the soluble form, particularly at elevated atmospheric temperatures, e. g., 90° F. I have found that the rate of reversion of the sulphur from the insoluble to the soluble form can be reduced to a very considerable extent, if not entirely obviated, if one holds the sulphur at a mildly elevated temperature for a sufficient length of time and then returns it to a normal atmospheric temperature.

This treatment is also of advantage on plastic sulphur for I have found retention at a moderately elevated temperature for a period of time sufficient to insure a material reduction in the reversion rate quickly converts the sulphur produced by certain processes from plastic and putty-like masses to hard crystalline bodies which can be readily comminuted. For example, when one quenches sulphur vapor or liquid sulphur in a suitable medium, or when one produces an insoluble sulphur by the reaction of $H_2S$ and $SO_2$ in an aqueous bath, a plastic mass frequently results. While this mass contains an appreciable insoluble sulphur fraction, it cannot be reduced to the finely divided form desired for use in many fields of commerce except by permitting it to stand for a relatively long period of time during which considerable reversion occurs. By treating the plastic sulphur, in accordance with this invention, the plastic putty-like masses are quickly converted to hard crystalline masses which can be ground readily in usual sulphur mills at the same time the reversion rate is reduced. The reduction in reversion rate is particularly noticeable in a plastic sulphur and the present invention is particularly applicable to these materials.

To insure stability of the insoluble sulphur fraction of the sulphur, it is necessary to retain the sulphur at a moderately elevated temperature for a period of time sufficient to insure stability upon return of the sulphur to a normal atmospheric temperature. While this treatment causes some reversion, after the treatment the material is relatively far more stable and its reversion rate is materially reduced. For example, a mass of insoluble sulphur was divided into seven batches. One was set aside as a control. The other six were then held at a temperature of 60° C. for periods of 1, 2, 4, 8, 24, 48 and 96 hours, and then returned to room temperature. At the end of the period of treatment the insoluble sulphur content was determined. The seven batches were then stored at room temperature for 9 months, and the insoluble sulphur content determined. The loss on the control or untreated batch was 5.25%; its original content was 43.2%; its content at the end of the period was 37.97%.

On the attached drawing I have shown graphically the sulphur content after the treatment, at the end of the storage, the loss during storage and the total loss due to storage and treatment. It will be observed that if the treatment is conducted over a period between five and seven hours the highest content is present at the end of the storage period. The treatment is effective to reduce the total loss to 3.5% as against 5.25% for the conditions chosen.

The effect is even more marked with a sulphur containing a higher percentage of insoluble; materials of between 60% and 99% insoluble are the ones usually marketed. To illustrate this two lots of the same sulphur were provided. One was treated by retention at 50° C. for five days, while the other was held at a normal atmospheric temperature. An accelerated reversion test was then given both lots by subjecting the sulphur, in finely divided form, to a constant reflux of boiling carbon bisulphide for an extended period; I have employed a four-hour period. The insoluble sulphur content of the untreated lot at the end of this period was 87.0%. The treated lot contained 95.0% insoluble; originally it contained 98.3% insoluble. The losses were therefore 11.3% for the untreated and 3.3% for the treated material. The accelerated test indicates what can be expected upon storage for long periods as between treated and untreated lots.

In the following table I have indicated results obtained under the accelerated test upon insoluble sulphur treated at 60° C. for the time periods indicated:

| Time of Retention, Hours | Reversion Loss Upon Reflux for 4 Hours |
|---|---|
| | Per cent |
| 1 | 4.0 |
| 5 | 2.6 |
| 10 | 2.2 |
| 20 | 1.9 |
| 50 | 1.5 |
| 100 | 1.22 |
| 250 | 0.94 |

The heat treatment can be given by retaining the sulphur in air or in a liquid medium which is not a solvent for insoluble sulphur for the desired period. The preferred temperature is between 50° C. and 60° C. but one can also use temperatures between 40° C. and 70° C. and even between 30° C. and 80° C. though at the latter temperatures the stabilization may not be economically feasible, too little stabilization being effected at the low temperature and too much reversion taking place at the higher temperature. Inasmuch as a batch of sulphur cannot quickly be raised to temperature, the heating period should be sufficient to insure that all of the sulphur attains the desired temperature unless some special means are employed for heating the sulphur. At 60° C. between one and two hours usually suffice, without any special interference with the manufacturing operation.

It is a feature of this invention that the reversion resistance imparted persists and one can, for example, extract a stabilized material with a a solvent to remove the soluble sulphur or alpha sulphur, the form which is soluble in carbon bisulphide. This enables one to stabilize a relatively crude material, extract it and leave a solid fraction which is nearly all, depending upon the extraction efficiency, insoluble in carbon bisulphide. The solid fraction is thus practically 100% insoluble in carbon bisulphide and is also stabilized. What small quantity reverts during stabilization is removed with the other soluble sulphur. As an extraction solvent one can use carbon bisulphide, benzene, toluene, xylene or the like.

I claim:

1. The process of stabilizing the carbon bisulphide insoluble fraction of a sulphur against reversion at ordinary temperatures to the soluble form comprising maintaining the sulphur at a temperature of from about 50° C. to about 60° C. for a time sufficient to stabilize the original insoluble fraction, and insufficient to cause more than a slight reduction of the insoluble sulphur content, and then cooling the material to the temperature of the atmosphere while said material has substantially its original insoluble sulphur content.

2. A process for treating sulphur containing S mu comprising maintaining the sulphur at about 60° C., for from one to two hours, sufficient to stabilize the S mu fraction present against reversion at ordinary temperatures but insufficient to cause more than a slight reduction of the insoluble sulphur content and then returning the sulphur to atmospheric temperature while said sulphur has substantially its initial insoluble sulphur content.

3. The process of stabilizing the carbon bisulphide insoluble fraction of a sulphur against reversion at ordinary temperatures to the soluble form comprising maintaining the sulphur at a temperature elevated above atmospheric temperature and from about 30° C. to about 80° C. for a period of several hours sufficient only to stabilize the original insoluble fraction present in said sulphur and insufficient to cause more than a slight reduction of the insoluble sulphur content and then returning the material to atmospheric temperature, while said material has substantially its original insoluble sulphur content.

4. The process of stabilizing the carbon bisulphide insoluble fraction of a sulphur against reversion at ordinary temperatures to the soluble form comprising maintaining the sulphur at a temperature elevated above atmospheric temperature and from about 40° C. to about 70° C. for a period of several hours sufficient only to stabilize the original insoluble fraction present in said sulphur and insufficient to cause more than a slight reduction of the insoluble sulphur content and then returning the material to atmospheric temperature, while said material has substantially its original insoluble sulphur content.

5. A process for treating a plastic sulphur having a substantial insoluble sulphur content comprising maintaining the plastic sulphur at a temperature elevated above atmospheric temperature and from about 30° C. to about 80° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, and then returning the sulphur to atmospheric temperature while said material has substantially its original insoluble sulphur content.

6. A process for treating a plastic sulphur having a substantial insoluble sulphur content comprising maintaining the plastic sulphur at a temperature elevated above atmospheric temperature and from about 40° C. to about 70° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, and then returning the sulphur to atmospheric temperature while said material has substantially its original insoluble sulphur content.

7. A process for treating a plastic sulphur having a substantial insoluble sulphur content comprising maintaining the plastic sulphur at a temperature elevated above atmospheric temperature and from about 50° C. to about 60° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, and then returning the sulphur to atmospheric temperature while said material has substantially its original insoluble sulphur content.

8. The process of stabilizing the carbon bisulphide insoluble fraction of a sulphur against reversion at ordinary temperatures to the soluble form comprising maintaining the sulphur at a temperature of from about 50° C. to about 60° C. for a time sufficient to stabilize the original insoluble fraction, and insufficient to cause more than a slight reduction of the insoluble sulphur content, cooling the material to the temperature of the atmosphere while said material has substantially its original insoluble sulphur content, and then extracting from the sulphur with a solvent substantially all sulphur soluble in carbon bisulphide.

9. A process for treating sulphur containing S mu comprising maintaining the sulphur at about 60° C. for from one to two hours, sufficient to stabilize the S mu fraction present against reversion at ordinary temperatures but insufficient to cause more than a slight reduction of the insoluble sulphur content, returning the sulphur to atmospheric temperature while said sulphur has substantially its initial insoluble sulphur content, and then extracting from the sulphur with a solvent substantially all sulphur soluble in carbon bisulphide.

10. The process of stabilizing the carbon bisulphide insoluble fraction of a sulphur against reversion at ordinary temperatures to the soluble form comprising maintaining the sulphur at a temperature elevated above atmospheric temperature and from about 30° C. to about 80° C. for a period of several hours sufficient only to stabilize the original insoluble fraction present in said sulphur and insufficient to cause more than a slight reduction of the insoluble sulphur content, returning the material to atmospheric temperature while said material has substantially its original insoluble sulphur content, and then extracting from the sulphur with a solvent substantially all sulphur soluble in carbon bisulphide.

11. The process of stabilizing the carbon bisulphide insoluble fraction of a sulphur against reversion at ordinary temperatures to the soluble form comprising maintaining the sulphur at a temperature elevated above atmospheric temperature and from about 40° C. to about 70° C. for a period of several hours sufficient only to stabilize the original insoluble fraction present in said sulphur and insufficient to cause more than a slight reduction of the insoluble sulphur content, returning the material to atmospheric temperature while said material has substantially its original insoluble sulphur content and then extracting from the sulphur with a solvent substantially all sulphur soluble in carbon bisulphide.

12. A process for treating a plastic sulphur having a substantial insoluble sulphur content comprising maintaining the plastic sulphur at a temperature elevated above atmospheric temperature and from about 30° C. to about 80° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, returning the sulphur to atmospheric temperature while said material has substantially its original insoluble sulphur content, and then extracting from the sulphur with a solvent substantially all sulphur soluble in carbon bisulphide.

13. A process for treating a plastic sulphur having a substantial insoluble sulphur content comprising maintaining the plastic sulphur at a temperature elevated above atmospheric temperature and from about 40° C. to about 70° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, and then returning the sulphur to atmospheric temperature while said material has substantially its original insoluble sulphur content, and then extracting from the sulphur with a solvent substantially all sulphur solvent in carbon disulphide.

14. A process for treating a plastic sulphur having a substantial insoluble sulphur content comprising maintaining the plastic sulphur at a temperature elevated above atmospheric temperature and from about 50° C. to about 60° C. for a period of several hours sufficient to convert the plastic sulphur to a hard crystalline form and to stabilize without substantial loss the original insoluble fraction present against reversion at ordinary temperatures, but insufficient to cause more than a slight reduction of the insoluble sulphur content, returning the sulphur to atmospheric temperature while said material has substantially its original insoluble sulphur content, and then extracting from the sulphur with a solvent substantially all sulphur soluble in carbon bisulphide.

EDMUND C. MISSBACH.

REFERENCES CITED

The following references are of record in the file of this patent:

Smith et al., "Über den amorphen Schwefel," Zeitschrift für Physikalische Chemie, vol. 42, pages 469–80 at p. 473 (1903).